United States Patent [19]
Johnson

[11] 4,060,072
[45] Nov. 29, 1977

[54] SOLAR HEATER APPARATUS

[75] Inventor: Donald F. Johnson, Watertown, S. Dak.

[73] Assignee: American Solar Energy Corporation, Denver, Colo.

[21] Appl. No.: 701,759

[22] Filed: July 1, 1976

[51] Int. Cl.² .............................................. F24J 3/02
[52] U.S. Cl. .................................. 126/271; 237/1 A; 165/168; 165/170
[58] Field of Search ............... 126/270, 271; 237/1 A; 165/168, 170

[56] References Cited
U.S. PATENT DOCUMENTS

| 3,314,414 | 4/1967 | Rowekamp | 126/271 |
| 3,996,918 | 12/1976 | Quick | 126/270 |

FOREIGN PATENT DOCUMENTS

| 724,819 | 5/1932 | France | 126/271 |
| 2,455,576 | 9/1975 | Germany | 126/271 |

Primary Examiner—Kenneth W. Sprague
Assistant Examiner—James C. Yeung
Attorney, Agent, or Firm—Dugger, Johnson & Westman

[57] ABSTRACT

Solar heating apparatus that includes a solar panel having a generally rectangular box type frame that is open at the front, glass panes mounted on the frame to close the front opening and provide a dead air space, a plurality of horizontally elongated, generally rectangular tubular channels mounted with the top wall of a lower channel in abutting relationship with the bottom wall of the next higher channel, a water inlet opening through one end of the uppermost channel, a water outlet opening through one end of the lowermost channel, conduits interconnecting the channels to provide a liquid flow path serially through the channels from the uppermost channel to the lowermost channel, a heat storage reservoir, lines including a pump for pumping liquid from a heat exchanger in the storage reservoir to the panel inlet and return the liquid from the outlet to the heat exchanger, control mechanism for operating the pump in response to temperature changes in the panel, and a heat transfer system for transferring heat from the reservoir to a room or other facility to be heated. The rate of liquid flow through the panel is controlled so that only the lower portion of each channel contains liquid, for example water.

7 Claims, 2 Drawing Figures

SOLAR HEATER APPARATUS

BACKGROUND OF THE INVENTION

A solar heating system that includes a solar panel.

In view of the present world energy shortage, it is desirable to provide a relatively efficient solar heating system that is inexpensive to build. Various systems have been proposed, for example such as disclosed in U.S. Pat. No. 507,618; U.S. Pat. No. 3,236,294; U.S. Pat. No. 695,136 and others. In prior art solar heating systems wherein cold water is fed into a lowermost channel of a plurality of horizontally elongated channels and flows upwardly to pass through an outlet that opens to the uppermost channel, all of the channels with the possible exception of the uppermost channel have to be filled with water to provide for water flow to the heat reservoir. In other systems such as U.S. Pat. No. 3,236,294 water is fed into the top of a collector to flow downwardly over corrugated aluminum. However, with such prior art systems, the efficiency of the heat transfer in the solar panel to the liquid flowing through the panel is not as great as desired. In order to provide for a more efficient heat transfer system and provide other advantages, this invention has been made.

SUMMARY OF THE INVENTION

Solar heating apparatus that includes a solar heating panel having a box type frame that mounts a pane of glass to close an open front of the frame, a plurality of horizontally elongated, generally rectangular tubular channels mounted in the frame between the glass pane and the rear of the frame, the channels being mounted with the top wall of a lower channel abutting against the bottom wall of the next uppermost channel, conduits connecting the channels to provide flow of liquid successively through the next lower channel, and a pump system for transferring liquid between a heat reservoir and the channels, the rate of flow of liquid being controlled so that only the lower portion of each channel has water therein.

An object of this invention is to provide a new and novel solar panel wherein tubular channels are mounted in abutting relationship and water is circulated from the top channel to the next lowermost channel with the flow controlled to only partially fill each channel.

Figure 1:
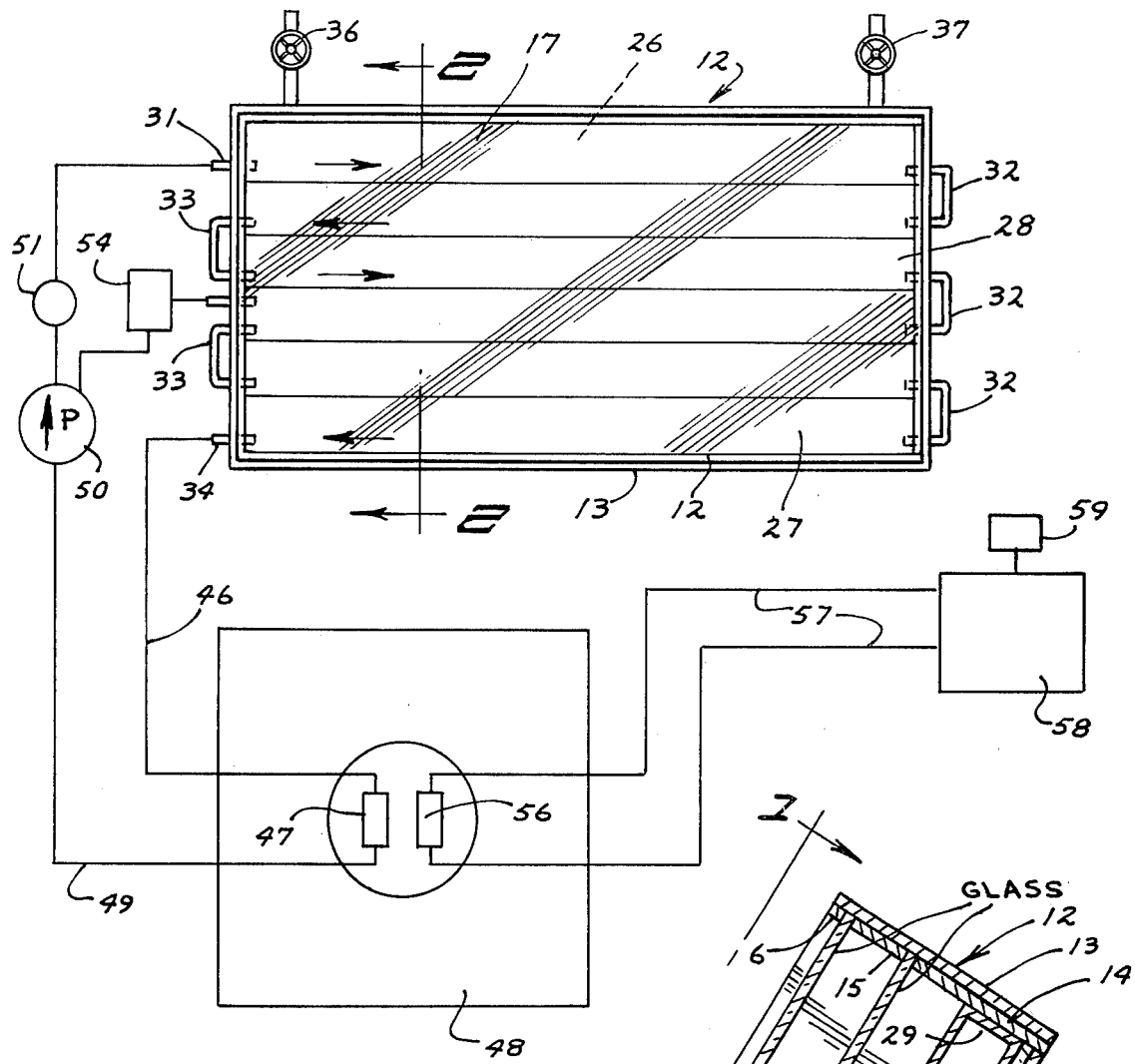
FIG. 1 is a front view of the solar panel of this invention, generally taken along the line and in the direction of the arrow 1—1 of FIG. 2, and a diagrammatic illustration of the liquid circulation and heat transfer system connected to the panel.

Referring now to the drawings, the solar heating system of this invention includes a solar panel generally designated 12, the panel including a generally rectangular frame 13 that is open at the front and rear thereof. A plurality of open rectangular spacer subframes 14, 15 and 16 are mounted in the frame, a glass pane 17 being provided between spacers 15 and 16 to close the front opening of frame 12. Mounted between subframes 14 and 15 is a glass pane 18; glass pane 17 and 18 being spaced from one another and in conjunction with the subframe 15 providing a closed dead air chamber 19. Suitable gaskets (not shown) may be provided between the glass panes and subframes. The back opening of frame 13 is closed by insulation layers 23, 24; layer 24 being more closely adjacent pane 18 than layer 23 and being of a heat reflective type to minimize heat losses.

Mounted within the rectangular frame 13 are a plurality of horizontally elongated, generally rectangular tubular channels, the tubular channels including a top channel 26, a bottom channel 27 and a plurality of intermediate channels 28. The top wall 29 of the channel 27 abuts against the bottom wall 30 of the adjacent intermediate channel while the bottom wall of each of the other channels abuts against the top wall of the channel therebeneath. Preferably the height of each channel is substantially greater than the width thereof. These channels are mounted in a frame 12 to provide a dead air chamber 20 between the pane 18 and said channels. Further, advantageously the back walls of the channels abut against the insulating layer 24.

Each of the channels has end walls 25 closing the end thereof, a water inlet 31 being provided to pass through the subframe 14 and frame and open through one end wall of the top channel 26 to open to the interior thereof. Likewise a water outlet 34 opens through the subframe and frame to open to one end wall of the bottom channel 27 to open to the interior thereof. If an even number of channels are provided such as illustrated in the drawings, then conduits 33 are provided for each set of vertically adjacent pairs of intermediate channels, each conduit opening through the one end wall of the upper one of the respective pair for conducting liquid to the intermediate channel therebeneath, such as shown in FIG. 1. Further, there are provided conduits 32 that open through the opposite end walls of the channels such as shown in FIG. 1. That is, advantageously the channels are connected to provide a serial flow through the channels with the liquid passing through inlet 31 into one end of the top channel 26 to pass therethrough and be conducted by conduit 32 to the opposite end of channel 27 that is immediately therebeneath, pass through the uppermost intermediate channel 27 to the one end thereof and be conducted by a conduit 33 to the one end of the next lower channel and etc. to ultimately be discharged through outlet 34. The inlet 31, the outlet 23, and inlets and outlets of the conduits 32 and 33 open to only the lower portion of the respective channel, i.e., the openings not extending above the lower half of the respective channel, and preferably not even that high in the respective channel. This provides a dead air space in each channel above the level of the liquid in the respective channel.

A check valve 36 is mounted on a frame to open through the top wall of the uppermost channel into the interior thereof, the check valve permitting the passage of air into the interior of the uppermost channel when a vacuum develops therein, but prevents passage of fluid in the opposite direction. The provision of the check valve 36 facilitates draining water from the channels.

A pressure relief valve 37 is mounted on the frame to open through the top wall of the top channel, the relief valve being provided to automatically open in the event that there is any substantial buildup of steam or air pressure in the top channel.

For storing heat energy collected by the solar panel, there is provided a heat reservoir or heat storage bin 48 which preferably is a large concrete block that is surrounded by one or more layers of heat reflective insulation (not shown) to minimize the loss of heat therefrom. Located within the block is a heat transfer unit 47 which advantageously may be a plurality of heat transfer tubes connected in end to end relationship and spaced from one another within the block. One end of the heat transfer unit 47 is connected by a liquid conducting line 46 to outlet 34 while the opposite end is connected to inlet 31 by a liquid conduit 49. Located within line 49 is a pump 50 and a shut-off valve 51. The pump is provided for circulating liquid through lines 46, 49, and heat exchanger 47 to flow in a direction to pass through inlet 31 and thence through the channels to exit through outlet 34.

For transferring heat from the heat reservoir 48 to the place of use, a heat transfer unit 56 is provided in the heat reservoir and connected by lines 57 to the heat transfer unit 58 that is located in a place that is to be heated, for example in the hot air system of a house. Appropriate thermostatic controls 59 are connected to the heat transfer unit 58 for controlling heat transfer from the heat storage unit 48 and through the heat transfer unit 58 to the place that it is to be used. The heat reservoir can be located in any suitable location, for example buried in the ground outside of a house, or in the basement of the house or etc. Since members 47, 48 and 56–59 may be of a conventional construction, the construction thereof will not be further described.

In using the apparatus of this invention, the solar panel 12 is mounted in a suitable location, for example on the south slope of a roof or a house or may be located in the yard. Preferably the panel is mounted on a suitable stand whereby its angle with reference to the sun may be varied to obtained the maximum heat energy from the sun, and in connection therewith, suitable conventional stands may be used. When the temperature within chamber 20 exceeds a preselected minimum, for example about 120° F., controls 54 will automatically turn on pump 50 to pump water through the inlet 31 into the top channel and thence through the channel to the top conduit 32 and thence downwardly to the next lower channel and etc. until the water flows through the outlet 34 and thence through the transfer unit 47 wherein the heat is transferred from the water to the block 48. The water thence returns through line 49 to the pump. The pumping of water into the top channel may result in a buildup of pressure in the channels; however, the buildup is not sufficiently great to result in air discharging through the valve 37. The flow rate of water through the panel is controlled so that the height of the water in each channel is less than one-half of the maximum vertical dimension of the channel, the maximum vertical dimension varying with the angle of inclination of the panel providing rectangular channels are used. This provides a dead air space between the top surface of the water and the uppermost portion of the channel and accordingly the walls of the channel above the liquid level are not unduly cooled as the water passes therethrough. The top wall of any of the channels below the top channel transfer heat through the adjacent bottom wall of the next uppermost respective channel wherein it is transferred to the liquid flowing therethrough. Thus, the heat in any one channel above the liquid level in the respective channels flows in part downwardly through the channel to the surface of the channel contacted by liquid, and in part flows upwardly through the walls of the channel to the top wall of the respective channel to the bottom wall of the next uppermost channel and thence is transferred to the liquid flowing through said next uppermost channel. This transfer of heat serves to prevent the channels from being too hot at the top and too cold at the bottom.

In the event that the water at the outlet 34 is above a given temperature, for example 160° F., the flow rate of the water is increased to remove a greater amount of heat from the channels to preclude any substantial amount of steam forming in the panel. A suitable temperature sensor (not shown) may be connected from the outlet to the controls 54 to control the speed of the pump, provided the pump is a variable speed pump, or through appropriate electronic and hydraulic controls the flow rate of the water through the channels may otherwise be controlled. When the temperature in chamber 20 falls below a predetermined level, for example 120° F., the controls 54 automatically shut off pump 50.

At the time heat is required in the house or other facility being heated, the controls 59 will automatically actuate the transfer system 58 whereby fluid flows through line 57 and heat transfer unit 56 to remove heat from block 48 and give off heat in the heating system of the house.

Preferably the channels are made of steel; however, other materials, for example aluminum can be used. As an example of the invention but not as a limitation thereof, the channels can be 2 inch by 6 inch channels of appropriate length, the inlet and outlet of each channel can be three-quarter inch O.D. pipe, and the rate of flow of liquid through the channels can be about two gallons per minute.

Figure 2:
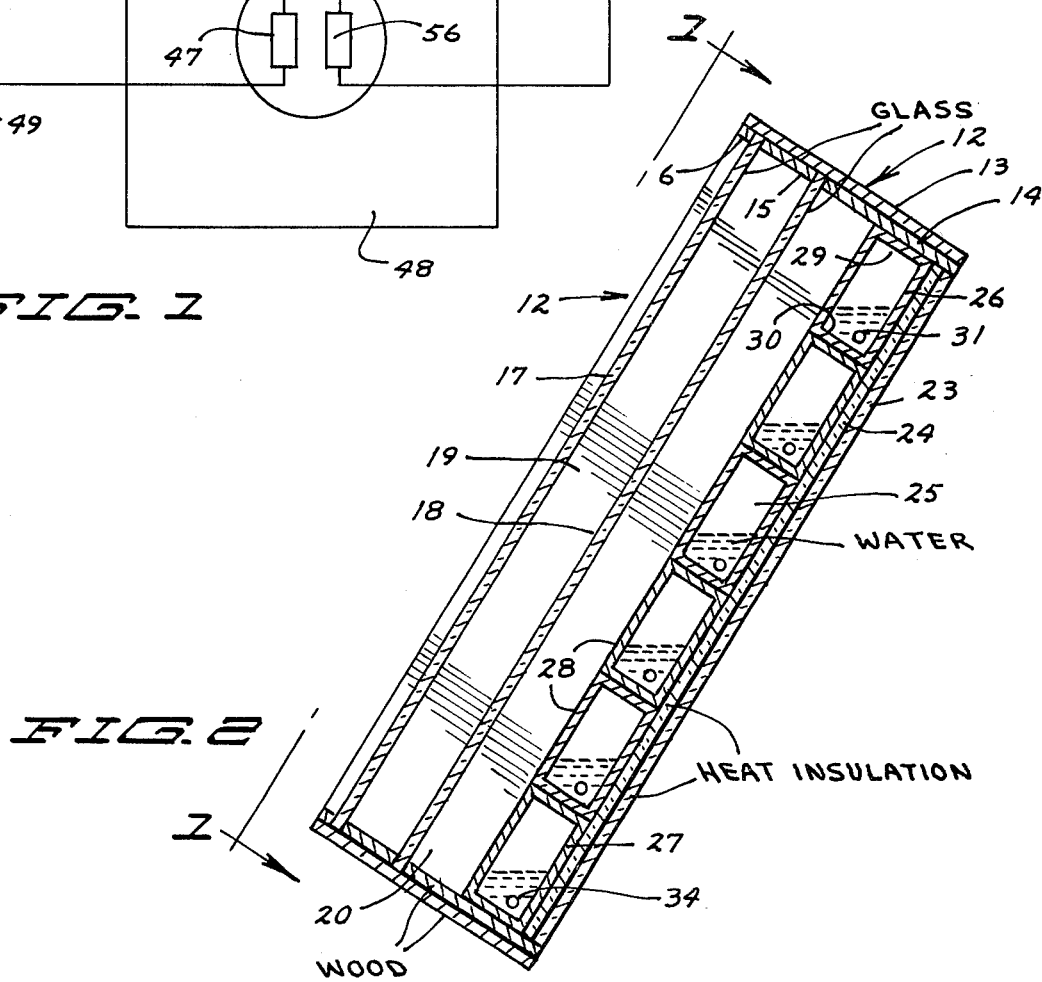
FIG. 2 is a cross-sectional view of the solar panel, said view being generally taken along the line and in the direction of the arrows 2—2 of FIG. 1.

It is to be understood that in place of a plurality of individual tubular channels, channels can be made by a pair of parallel steel metal plates that have parallel dividers extending therebetween to form other channels of construction such as generally illustrated in FIG. 2, whereby one divider wall would form the top wall of one channel and also the bottom wall of the channel thereabove.

What is claimed is:

1. Solar heating apparatus comprising a solar panel having a perimetric frame that has an upper wall, a lower wall, an open front side, and an open back side, first means joined to the frame to close the back side opening, second means that permits passage of infrared rays of the sun mounted on the frame in substantial spaced relationship to the first means to close the front side opening, wall means defining a plurality of horizontally elongated tubular fluid channels with one extending vertically above the other mounted in the frame between the first and second means and spaced from the second means, each channel having a top wall portion, a bottom wall portion, a first end wall and a second end wall, a liquid inlet opening to the interior of the vertically uppermost fluid channel adjacent the first end wall thereof, a liquid outlet opening to the interior of the vertically lowermost fluid channel adjacent one of the end walls thereof, and conduit means opening to interiors of the fluid channels adjacent the end walls thereof other than the ones adjacent the liquid inlet and liquid outlet for interconnecting the channels to provide a liquid flow path between the channels from the liquid inlet to the liquid outlet with the liquid flowing in a direction through a channel that is opposite the direction of flow through the channel immediately vertically therebeneath, means remote from the panel for storing heat energy, and means for conducting liquid from the liquid outlet to the heat storing means and from the heat storing means to the liquid inlet whereby liquid from the heat storing means passes through the liquid inlet and along the liquid flow path to the liquid outlet, the liquid connecting means including means for controlling the flow of liquid through the liquid inlet to maintain liquid in each channel at a level that is a substantial distance below the top wall portion of the respective channel to provide a dead air space in each channel above the level of the liquid in the respective channel.

2. The apparatus of claim 1 further characterized in that the conduit means includes for each channel other than the lowermost channel a discharge opening that opens to the interior of the respective channel vertically more closely adjacent the bottom wall portion of the respective channel than the top wall portion thereof, and includes for each channel an inlet opening that opens to the interior of the respective channel vertically more closely adjacent the bottom wall portion of the respective channel than the top wall portion thereof.

3. The apparatus of claim 2 further characterized in that each of the channels is a generally rectangular metal channel, and that the bottom wall portion of the uppermost channel is in abutting relationship to the top wall portion of the channel vertically therebeneath.

4. Solar heating apparatus comprising a solar panel having a plurality of horizontally elongated, generally rectangular, tubular liquid channels with the channels being one generally vertically above the other, each channel having a first end wall portion, a horizontally opposite second end wall portion, a top wall portion and a bottom wall portion, the bottom wall portion of each channel that is vertically above another being in contact with the top wall portion of the channel immediately therebeneath, perimetric frame means for mounting said channels, means cooperating with the frame means for providing a dead air chamber that opens to the channels, the cooperating means including means that permits passage of infrared rays of the sun to pass through the dead air chamber and impinge on the channels, a liquid inlet opening through the first end wall of the uppermost channel to the interior thereof, a liquid outlet opening through one of the end walls of the lowermost channel to the interior thereof at a location more closely adjacent the bottom wall portion of the lowermost channel than the top wall portion thereof and means for fluidly connecting the channels in series to provide a fluid flow path from the liquid inlet through the uppermost channel and sequentially through each next lower channel to the liquid outlet, the series connecting means having an opening through which liquid is discharged from the respective channel that is more closely adjacent the bottom wall portion of the respective channel than the top wall portion thereof, a heat storage receptacle, and means to conduct liquid from the liquid outlet to said storage receptacle, give up heat energy to the receptacle and conduit liquid to the liquid inlet, and control means connected to the liquid conduit means for regulating the rate of flow of liquid to the liquid inlet to an amount that the liquid in each of the channels remains at a level substantially below the top wall portion thereof.

5. The apparatus of claim 4 further characterized in that the conduit means includes a pump, that the control means includes a control for turning the pump on when the temperature in the dead air chamber exceeds a preselected value and turning the pump off when the temperature in the dead air chamber falls below a preselected value.

6. The apparatus of claim 4 further characterized in that there is provided valve means opening to the uppermost channel to permit air flow thereinto when a vacuum develops therein and permit discharge therefrom when the pressure in the uppermost channel exceeds a preselected value.

7. The apparatus of claim 4 further characterized in that the panel includes means that permits the passage of infrared rays mounted on the frame means to provide a dead air chamber opposite the first dead air chamber from the channels, that the control means controls the rate of flow in the channels to a level that each channel is less than half full of liquid and that each liquid opening and discharge opening for each channel opens only to the lower half of the respective channel.

* * * * *

UNITED STATES PATENT AND TRADEMARK OFFICE
CERTIFICATE OF CORRECTION

PATENT NO. : 4,060,072
DATED : November 29, 1977
INVENTOR(S) : Donald F. Johnson It is certified that error appears in the above-identified patent and that said Letters Patent are hereby corrected as shown below:

Column 5, line 3, (Claim 1, line 32) "connecting" should be --conducting--.

Signed and Sealed this

Seventh Day of March 1978

[SEAL]

Attest:

RUTH C. MASON
Attesting Officer

LUTRELLE F. PARKER
Acting Commissioner of Patents and Trademarks